United States Patent
Gill

(10) Patent No.: US 12,129,134 B2
(45) Date of Patent: Oct. 29, 2024

(54) TEMPERATURE CONTROL DOCKING SYSTEM

(71) Applicant: Cold Freight Services, Austell, GA (US)

(72) Inventor: David Avant Gill, Lithia Springs, GA (US)

(*) Notice: Subject to any disclaimer, the term of this patent is extended or adjusted under 35 U.S.C. 154(b) by 174 days.

(21) Appl. No.: 16/916,883

(22) Filed: Jun. 30, 2020

(65) Prior Publication Data

US 2021/0002092 A1  Jan. 7, 2021

Related U.S. Application Data

(60) Provisional application No. 62/869,224, filed on Jul. 1, 2019.

(51) Int. Cl.
*F24F 11/00* (2018.01)
*B60P 3/20* (2006.01)
(Continued)

(52) U.S. Cl.
CPC ............. *B65G 69/28* (2013.01); *B60P 3/20* (2013.01); *B65G 69/00* (2013.01); *B65G 69/008* (2013.01); *F24F 11/0001* (2013.01); *B65G 2203/0283* (2013.01); *B65G 2203/042* (2013.01); *B65G 2203/045* (2013.01); *B65G 2814/0205* (2013.01)

(58) Field of Classification Search
CPC .... B65G 2203/0233; B65G 2203/0283; B65G 69/28
See application file for complete search history.

(56) References Cited

U.S. PATENT DOCUMENTS 6,205,721 B1 * 3/2001 Ashelin ............. B65G 69/008
52/173.2
2004/0216469 A1 * 11/2004 Viegas ............... B60H 1/00257
62/239
(Continued)

OTHER PUBLICATIONS

-65° C Dual Redundant Deep Freezer Container. Klinge Corporation, (4 pages). [Article, Online]. [Retrieved from the Internet Sep. 30, 2020]<URL: https://klingecorp.com/pharma/dual-redundant-deep-freezer-container/>.
(Continued)

*Primary Examiner* — Nelson J Nieves
*Assistant Examiner* — Meraj A Shaikh
(74) *Attorney, Agent, or Firm* — Alston & Bird LLP

(57) ABSTRACT

A temperature control docking system (TCDS) is configured for providing temperature controlled air for circulation within one or more freight trailers. The freight trailers are engaged with corresponding control docks of the TCDS, each control dock additionally defining a docking door configured between a closed configuration and an open configuration. The docking door separates the interior of the TCDS from an exterior thereof (and from the freight trailer). Upon engaging the freight trailer with the control dock, the docking door is configured to an open configuration, and a temperature maintenance unit positioned within the interior of the TCDS and corresponding with the control dock provides temperature controlled air for circulation within the interior of the freight trailer so as to maintain a desired temperature within the freight trailer.

17 Claims, 9 Drawing Sheets

(51) Int. Cl.
   *B65G 69/00* (2006.01)
   *B65G 69/28* (2006.01)

(56) References Cited

U.S. PATENT DOCUMENTS

| | | | | |
|---|---|---|---|---|
| 2015/0192309 | A1* | 7/2015 | Frolov | F24F 1/0003 |
| | | | | 62/262 |
| 2017/0343222 | A1* | 11/2017 | Markert | F24F 1/0011 |
| 2020/0041193 | A1* | 2/2020 | Sigety | F25D 17/06 |
| 2020/0102165 | A1* | 4/2020 | Olmsted | B65G 69/2882 |
| 2020/0239242 | A1* | 7/2020 | Hoofard | G05D 1/0225 |
| 2021/0082220 | A1* | 3/2021 | Boerger | G06Q 10/083 |
| 2021/0122590 | A1* | 4/2021 | Garner | B62D 63/06 |

OTHER PUBLICATIONS

*−60° C Blast Freezer Container—Sushi Transport Containers.* Klinge Corporation, (6 pages). [Article, Online]. [Retrieved from the Internet Sep. 30, 2020]<URL: https://klingecorp.com/sushi-transport-containers/60c-blast-freezer-container/>.

*Single Temperature Zone Refrigeration Unit for 10 Foot Refrigeration Unit.* Klinge Corporation, (6 pages). [Article, Online]. [Retrieved from the Internet Sep. 30, 2020]<URL: https://klingecorp.com/military/single-temperature-zone-refrigeration-unit-for-10-container/>.

*Picture Frame Dual Refrigeration Unit.* Klinge Corporation, (5 pages). [Article, Online]. Retrieved from the Internet Sep. 30, 2020]<URL: https://klingecorp.com/chemical/dual-redundant-explosion-proof-refrigeration-unit/>.

*−5° C to −25° C Dual Redundant Refrigeration Unit & Integral Genset.* Klinge Corporation, (6 pages). [Article, Online]. [Retrieved from the Internet Sep. 30, 2020]<URL: https://klingecorp.com/pharma/dual-redundant-nose-mount-refrigeration-unit/>.

*Refrigerated Container Services.* Matson, (5 pages). [Article, Online]. [Retrieved from the Internet Sep. 30, 2020]<URL: https://www.matson.com/reefer/index.html>.

*Chalfant Black Dock Door Seal Model 130 Heavy Duty 40 Ounce 8'Wx8'H.* Global Industrial, (4 pages). [Article, Online]. [Retrieved from the Internet Sep. 30, 2020]<https://www.globalindustrial.com/p/material-handling/dock-truck/dock-seals-shelters-roll-up-doors/black-dock-seal-40-ounce-8-w-x-8-h>.

*Loading Dock Doors.* Raynor Garage Door, (6 pages). [Article, Online]. [Retrieved from the Internet Sep. 30, 2020]<URL: https://raynor.com/commercial/loading-dock-doors/>.

* cited by examiner

TEMPERATURE CONTROL DOCKING SYSTEM

CROSS-REFERENCE TO RELATED APPLICATIONS

This patent application claims priority from U.S. Provisional Patent Appl. Ser. No. 62/869,224, filed Jul. 1, 2019, which is incorporated herein by reference in its entirety.

BACKGROUND

The transportation and shipping industries are charged with moving cargo between locations in an efficient manner while also ensuring the safety of the cargo they carry. These industries often utilize tractor-trailers, semi-trailers, cargo vans, shipping containers (e.g., mounted on wheeled trailers), and other related vehicles to transport cargo across long distances often spanning days or weeks in travel time. In some instances, the temperature of the transported cargo must be maintained in order for the cargo to be usable at its final destination (e.g., food transportation or other temperature sensitive freight). In the event that cargo items are damaged, spoil, or are otherwise unusable upon delivery, the transportation provider may be responsible for the loss of product. As such, transportation and shipping services are often looking for ways to ensure that their cargo arrives in proper condition to avoid these financial risks while maintaining customer satisfaction.

BRIEF SUMMARY

Certain embodiments are directed to a temperature control docking system (TCDS) comprising: at least one control dock each configured for receiving a freight trailer; a docking door at each of the at least one control dock and separating an interior of the TCDS from the freight trailer, and wherein the docking door is configured between a closed configuration and an open configuration; one or more temperature maintenance units positioned within an interior of the TCDS, wherein each of the one or more temperature maintenance units correspond with the at least one control dock, wherein each of the one or more temperature maintenance units are configured to supply climate controlled air for circulation within an interior of the freight trailer received at the at least one control dock while the docking door is in an open configuration.

In certain embodiments, the control dock comprises one or more sealing elements configured to interface with one or more corresponding elements of the freight trailer to define a seal between the TCDS and the freight trailer. Moreover, in certain embodiments the one or more sealing elements are configured to provide a weather-proof seal between the TCDS and the freight trailer. In various embodiments, the one or more sealing elements are adjustable to interface with a plurality of freight trailers. In certain embodiments, the TCDS additionally comprises a sensor system configured to detect engagement between the freight trailer and the at least one control dock, and a controller configured to, upon detecting engagement between the freight trailer and the at least one control dock, move the docking door to the open configuration. In certain embodiments, the sensor system is further configured to detect disengagement between the freight trailer and the at least one control dock, and the controller is configured to, upon detecting disengagement between the freight trailer and the at least one control dock, move the docking door to the closed configuration. In various embodiments, the sensor system comprises a plurality of pressure sensors within the at least one control dock, and wherein the plurality of pressure sensors are configured to detect a freight trailer applying pressure on the plurality of pressure sensors to detect engagement between the freight trailer and the at least one control dock. Moreover, the TCDS may additionally comprise a temperature sensor system configured to monitor a temperature within an interior of the freight trailer; and a controller configured to adjust operation of the temperature maintenance units based at least in part on a detected temperature within an interior of the freight trailer.

In certain embodiments, the temperature maintenance units are each configured for providing at least one of: heated output air or cooled output air, and wherein the temperature maintenance units comprise support wheels to facilitate movement of the temperature maintenance units within the interior of the TCDS. In various embodiments, each of the at least one temperature maintenance units comprise one or more ducts for directing climate controlled air into the interior of the freight trailer. In certain embodiments, the TCDS additionally comprises a controller configured for communication with one or more sensor systems of the freight trailer, and wherein the controller is configured to: receive temperature data from the one or more sensor systems of the freight trailer, wherein the temperature data is indicative of a temperature of the interior of the freight trailer; and adjust operation of the one or more temperature maintenance units based at least in part on the temperature data. In various embodiments, the TCDS is embodied as a mobile trailer, and wherein the one or more temperature maintenance units are located within an interior of the mobile trailer.

Certain embodiments are directed to a method for temperature maintenance within a freight trailer. In certain embodiments, the method comprises engaging a freight trailer with a control dock; configuring a docking door at the control dock to an open configuration, wherein the docking door separates an interior of a temperature control docking system (TCDS) from the freight trailer; monitoring a temperature within an interior of the freight trailer; and supplying temperature controlled air for circulation within the interior of the freight trailer from one or more temperature maintenance units positioned within the interior of the TCDS and corresponding with the control dock.

In various embodiments, engaging the freight trailer with the control dock comprises engaging one or more sealing elements to provide a weather-proof seal between the control dock and the freight trailer. In certain embodiments, the method further comprises adjusting the control dock to engage one or more features of the freight trailer. In certain embodiments, engaging the freight trailer with the control dock comprises applying pressure to one or more pressure sensors within the control dock. In various embodiments, monitoring the temperature within the interior of the freight trailer comprises receiving temperature data generated by one or more temperature sensors onboard the freight trailer. In certain embodiments, the method further comprises positioning the one or more temperature maintenance units adjacent the docking door so as to enable providing the temperature controlled air for circulation within the interior of the freight trailer.

BRIEF DESCRIPTION OF THE SEVERAL VIEWS OF THE DRAWINGS

Figure 1:
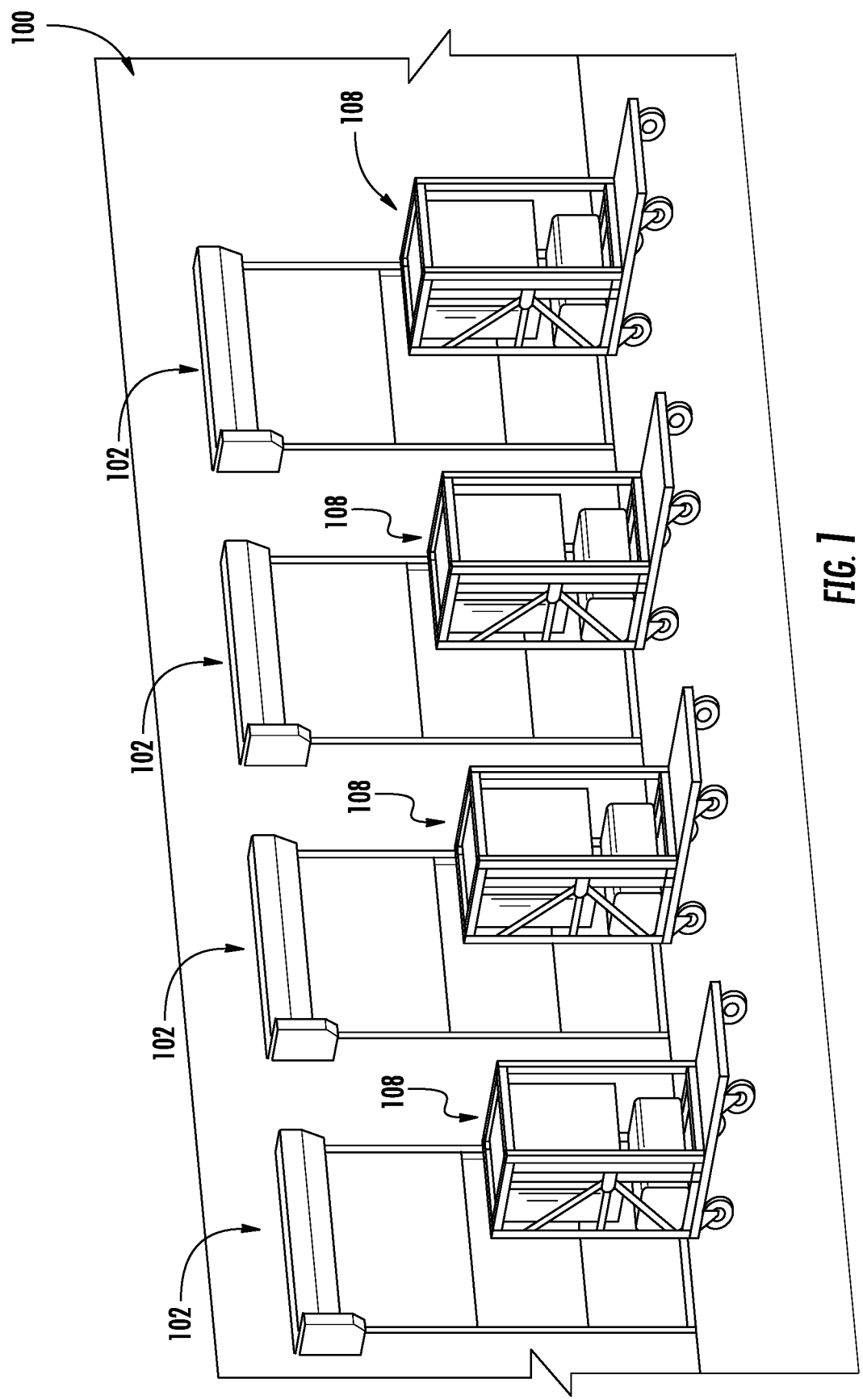

Having thus described the invention in general terms, reference will now be made to the accompanying drawings, which are not necessarily drawn to scale, and wherein:

FIG. 1 illustrates an internal view of a temperature control docking system including several control docks according to an example embodiment.

Figure 2:
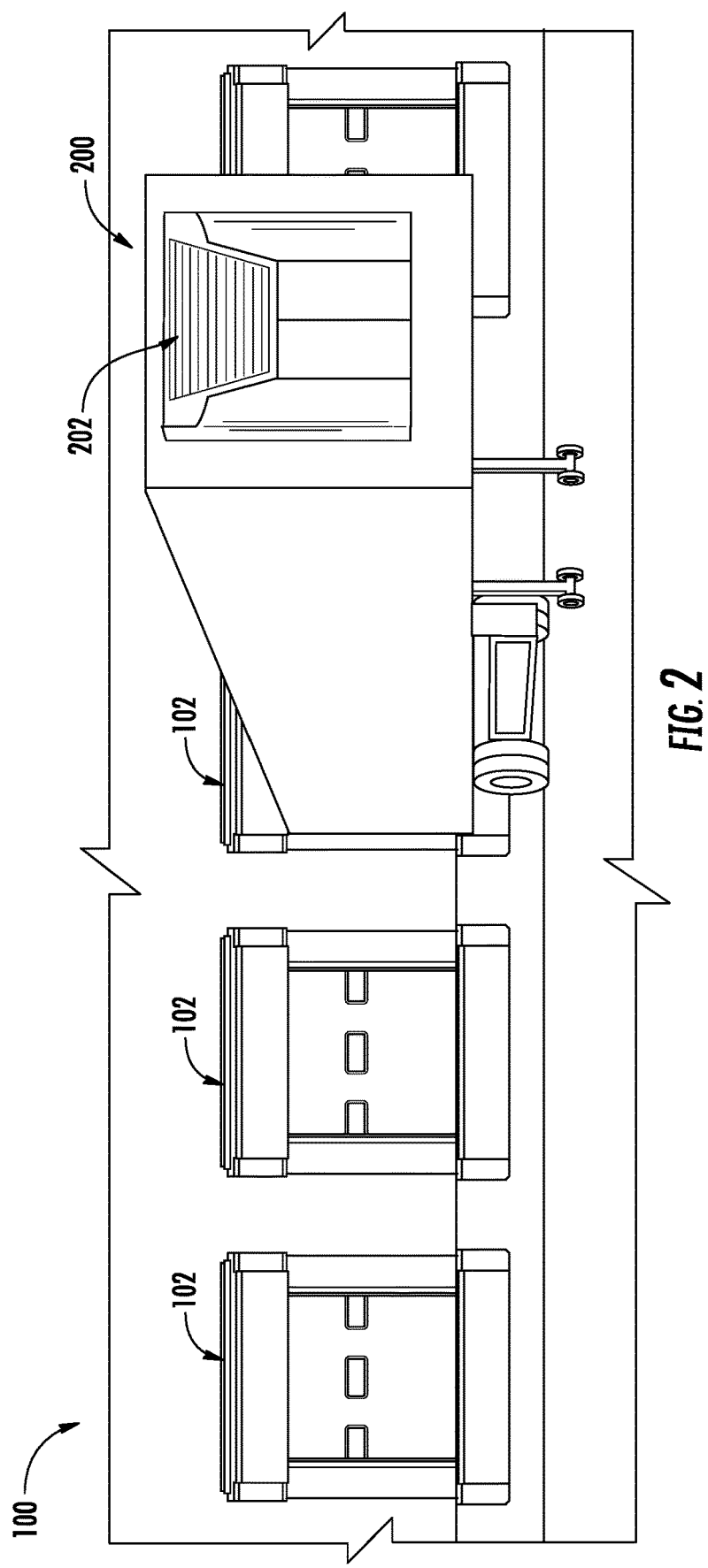

FIG. 2 illustrates an external view of the temperature control docking system of FIG. 1 having a control dock in receipt of a trailer according to an example embodiment.

Figure 3:
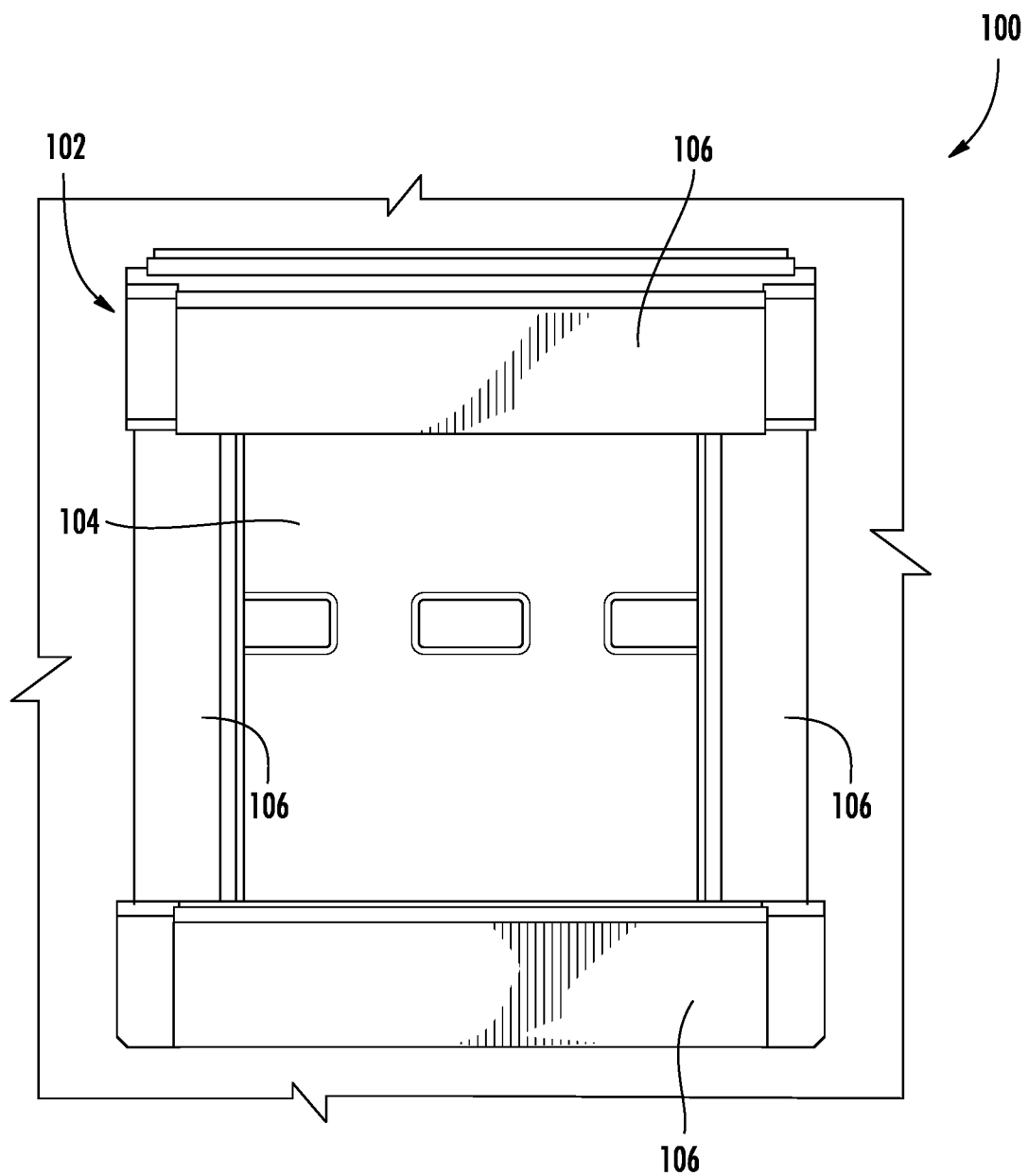

FIG. 3 illustrates an external view of an example control dock of FIG. 1 in a closed configuration according to an example embodiment.

Figure 4:
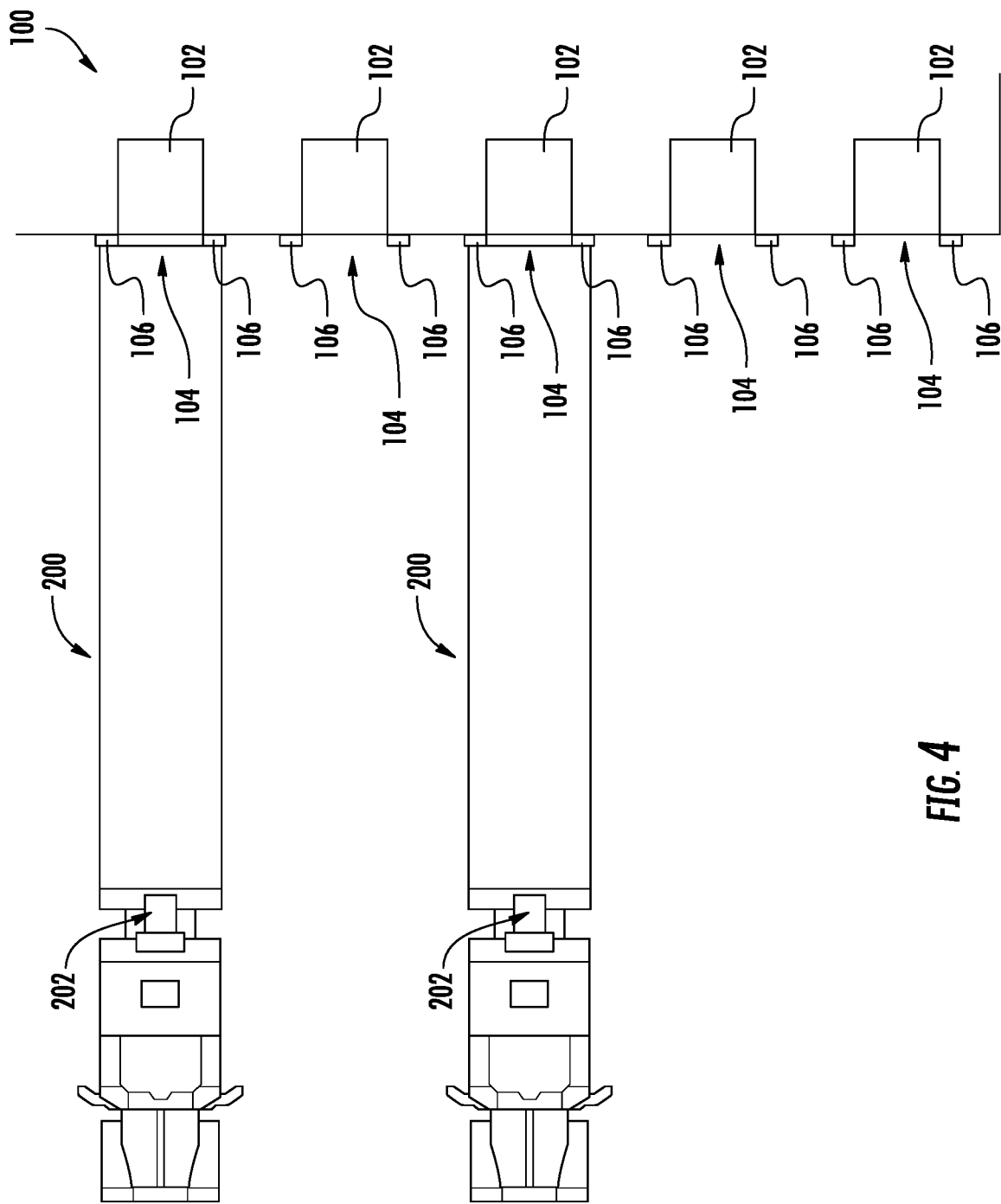

FIG. 4 illustrates a top view of the temperature control docking system of FIG. 1 in an operational configuration in which two control docks are in receipt of trailers according to various embodiments.

Figure 5:
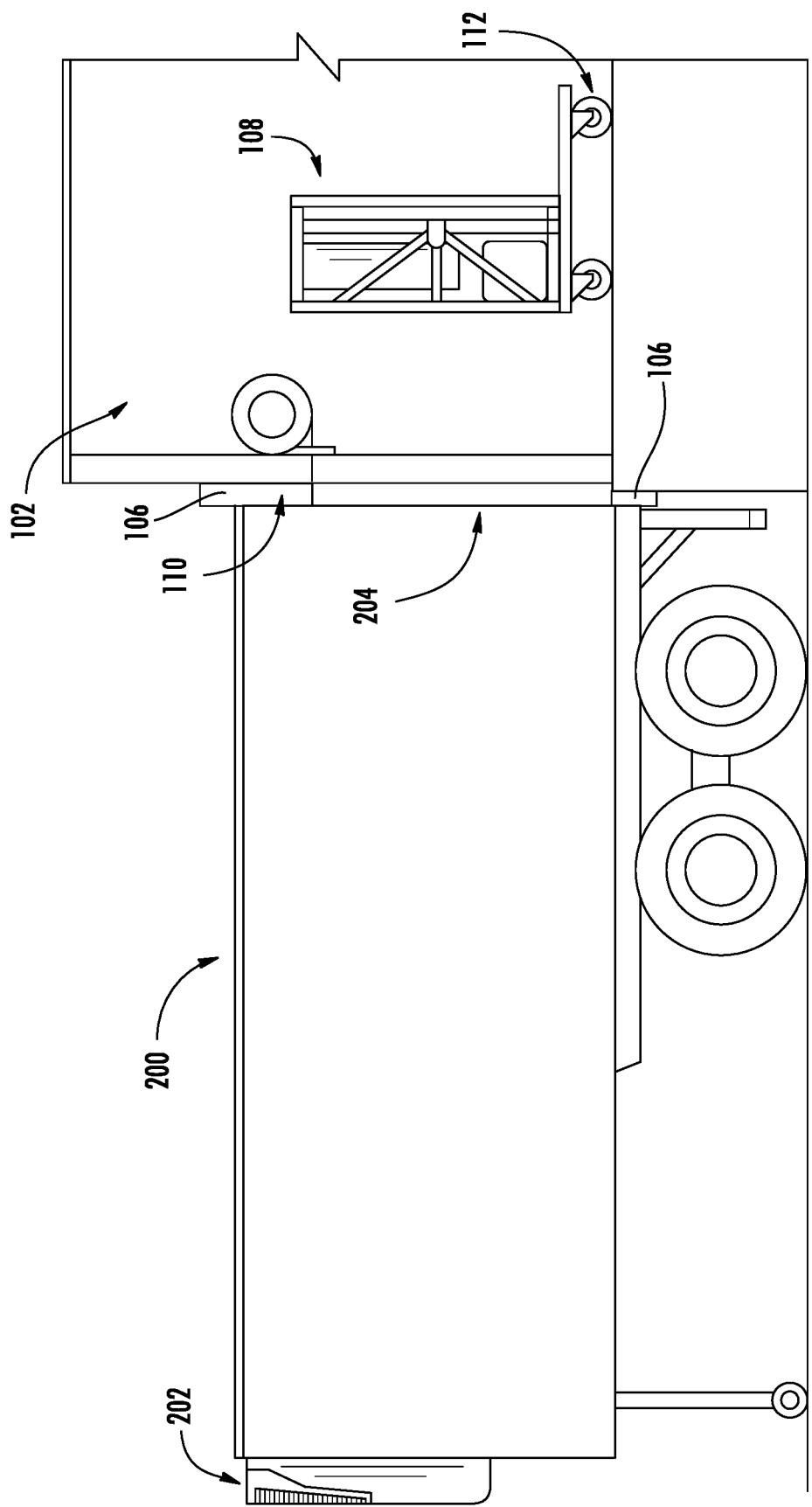

FIG. 5 illustrates a cross-sectional side view of an example control dock in an operational configuration according to an example embodiment.

Figure 6:
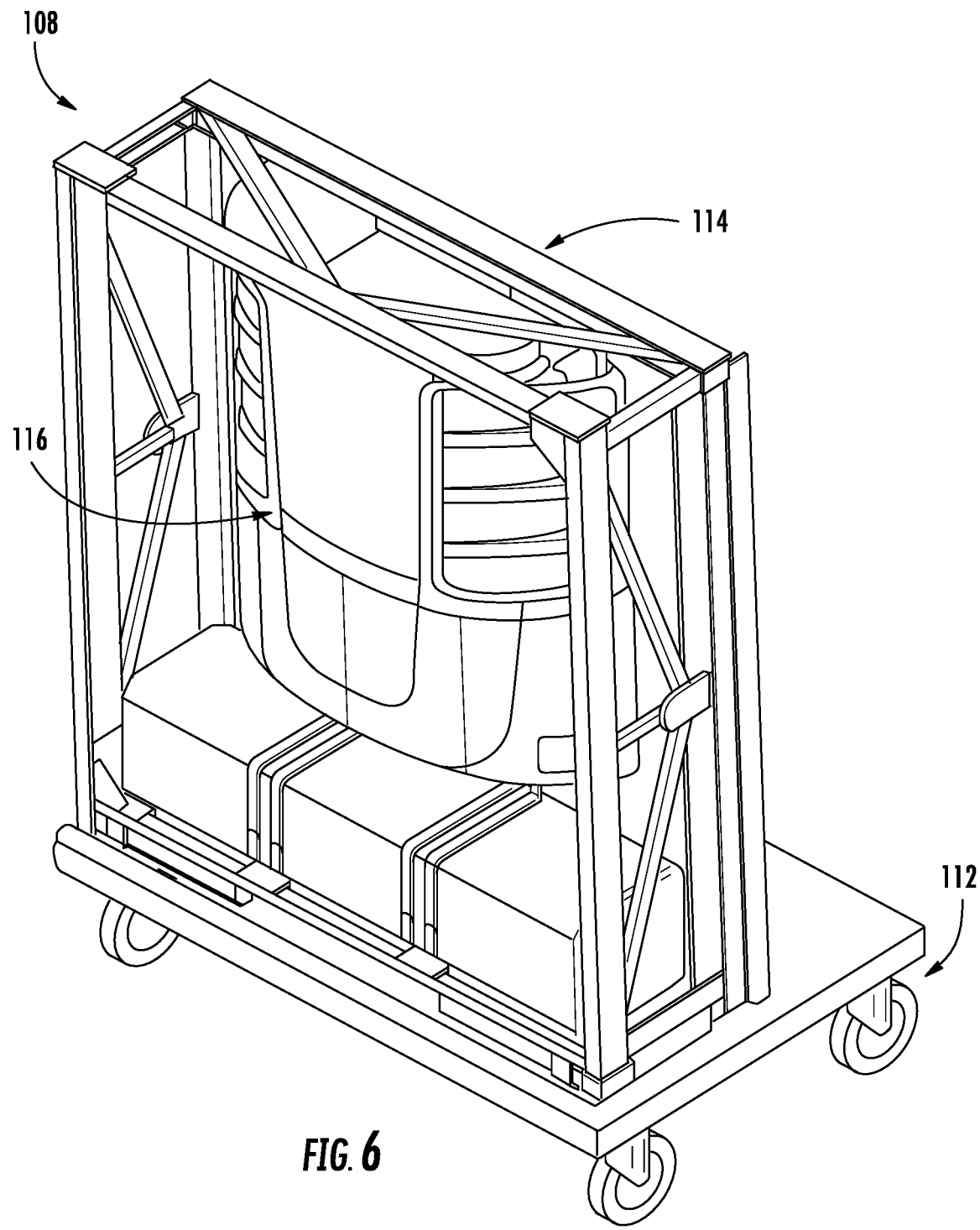

FIG. 6 illustrates a temperature maintenance unit according to an example embodiment.

Figure 7:
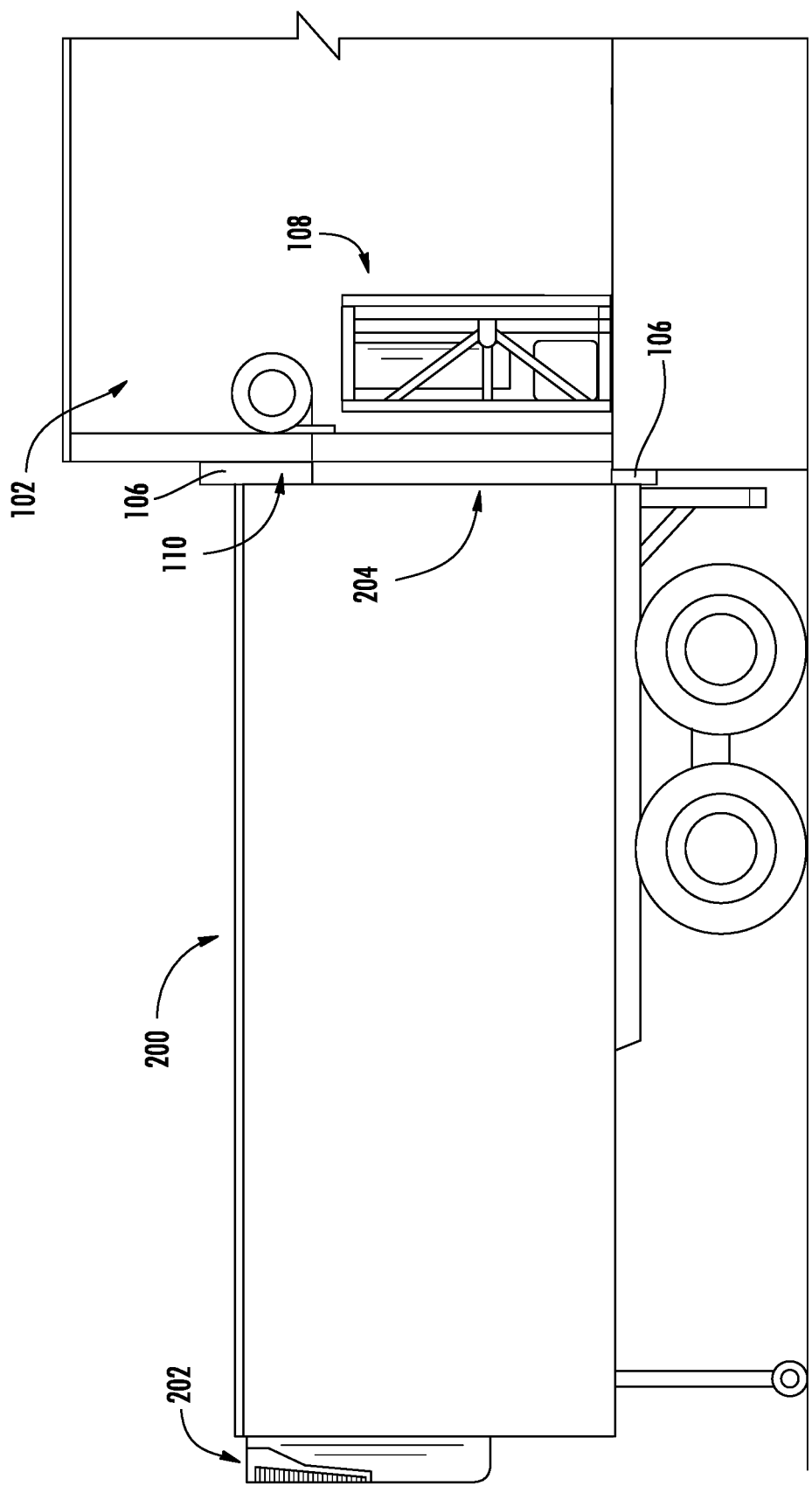

FIG. 7 illustrates a cross-sectional side view of an example control dock in operational configuration according to another example embodiment.

Figure 8:
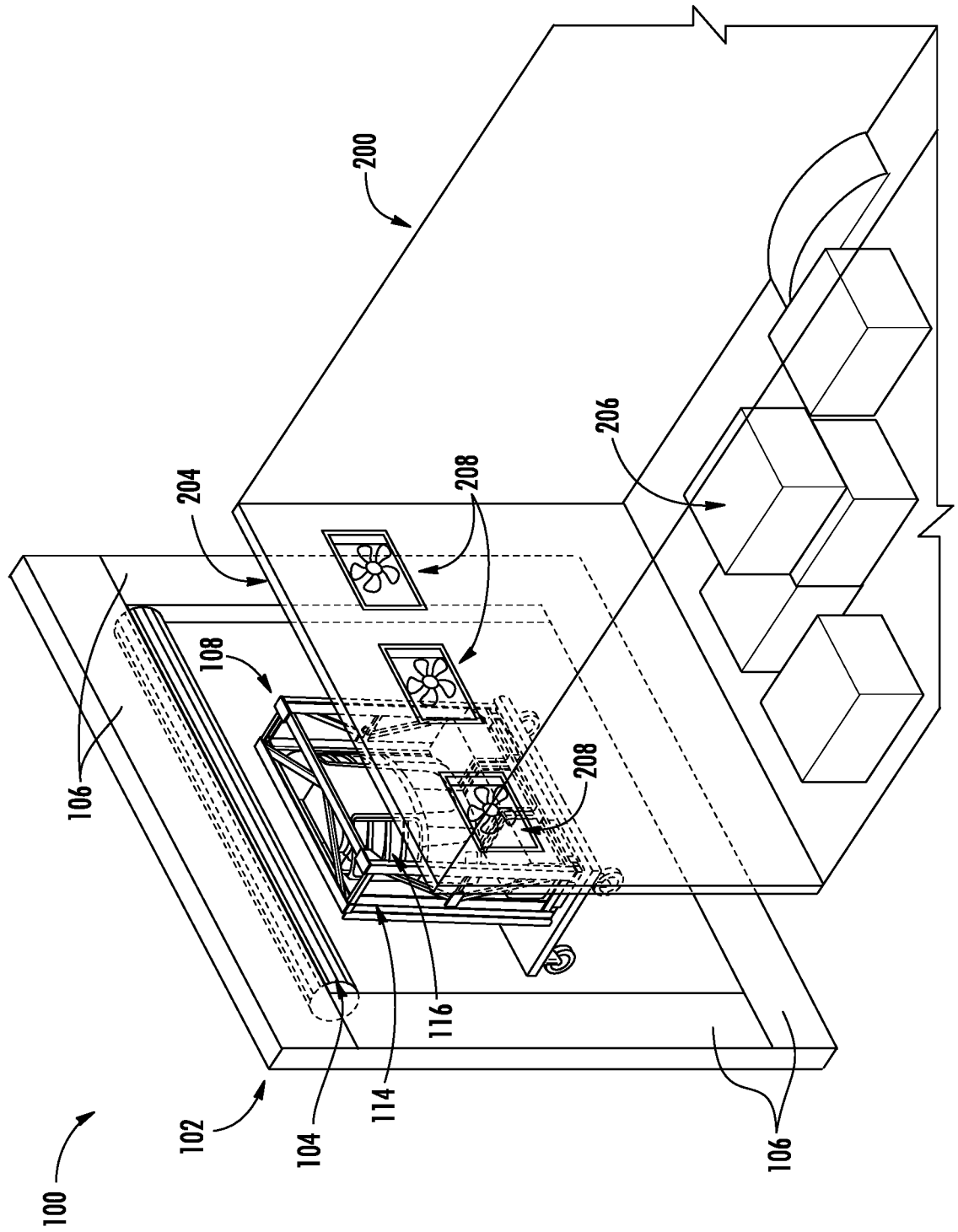

FIG. 8 illustrates a cross-sectional view of an example control dock and temperature maintenance unit in an operational configuration according to an example embodiment.

Figure 9:
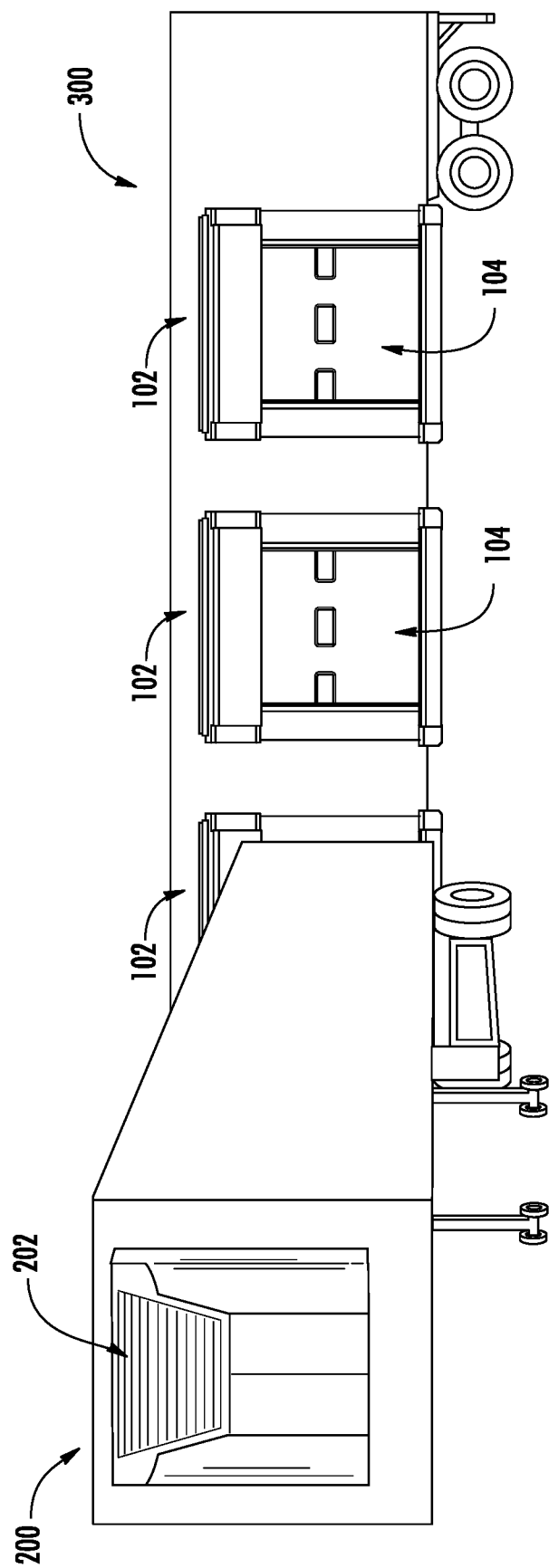

FIG. 9 illustrates a mobile temperature control docking system according to an example embodiment.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements.

The terms "illustrative" and "exemplary" are used to be examples with no indication of quality level. As used herein, the terms "approximately," "generally," and "substantially" refer to within manufacturing and/or engineering design tolerances for the corresponding materials and/or elements as would be understood by the person of ordinary skill in the art, unless otherwise indicated.

As used herein, reference is made to an example temperature control docking system (TCDS) and associated control docks for receiving a corresponding trailer (e.g., carrying perishable or otherwise temperature sensitive cargo). The present disclosure, however, contemplates that the TCDS and associated control docks of the present disclosure may be equally applicable to other transportation or shipping devices regardless of the dimension (e.g., size and shape) or the type of the containers, storage units, or the like used by these devices. Thus, the term "trailer" should not be read to limit the devices of the present disclosure to any particular type of shipping container or transportation vehicle. Like numbers refer to like elements throughout.

Overview

With reference to FIGS. 1-2, an example of a TCDS 100 for use with the shipping or transportation of temperature sensitive cargo is illustrated. As shown, the TCDS 100 may be embodied as a building or other structure defining one or more control docks 102 configured, in an operational configuration, to receive a corresponding trailer 200 attached thereto. As would be evident to one of ordinary skill in the art in light of the present disclosure, a trailer 200 may be attached to a corresponding semi-truck or the like (not shown) for driving the trailer 200 between locations (it should be understood that a trailer may be detachably secured to a semi-truck, or permanently attached to a vehicle. It should be understood that a trailer may comprise a support frame separate from the semi-truck or the trailer may be supported on a frame shared with a semi-truck). As shown in the example of FIG. 2, the trailer 200 may further define a heating, ventilation, and air conditioning unit (HVAC) 202 configured to cool and/or heat the cargo contained within the trailer 200. The HVAC 202 of the trailer 200 may be configured, based upon the type of cargo carried by the trailer, to supply cold and/or warm air to the interior of the trailer 200. By way of example, in some instances, the trailer 200 may contain perishable food items as cargo that must remain frozen (e.g., ice cream, meat products, etc.) to be safely received at the destination. In such an example, the HVAC 202 may be configured to supply and circulate cool air to the interior of the trailer 200 to maintain the perishable food items at a required temperature. In some instances, however, the trailer 200 may travel between locations in which the ambient temperature of the trailer is below freezing (e.g., during the winter or in colder climates). By way of example, the trailer 200 may contain sod or other plant/gardening products that will perish if frozen. In such an example, the HVAC 202 may be configured to supply and circulate warm air to the interior of the trailer 200 to maintain the plant/gardening products at a required temperature (e.g., to prevent freezing).

With continued reference to FIG. 2, the HVAC 202 of the trailer 200 may include a variety of elements for supplying cold and/or warm air to the interior of the trailer 200. As would be evident to one of ordinary skill in the art, the HVAC 202 may include condensers, evaporators, high capacity fans, and the like for circulating air and maintaining the temperature within the trailer 200. While shown in FIG. 2 in an operational configuration attached to the TCDS 100 as claimed, the HVAC 202 may be configured to maintain the temperature of the cargo contained within the trailer 200 during transit by utilizing one or more of the elements described above. During transit, however, one or more elements of the HVAC 202 may fail such that the temperature sensitive cargo contained within the trailer 200 may no longer be maintained at a desired temperature. Without a properly operating HVAC 202, the temperature sensitive cargo contained within the trailer 200 may spoil during transit such that the contents are unusable upon delivery. In some instances, the trailer 200 may be stored at a location without a power source/power supply for the HVAC 202 (e.g., detached from a fuel source of a semi-truck previously attached thereto). By way of example, once the semi-truck and attached trailer 200 reach a delivery destination for the trailer 200 (e.g., for ultimately unloading the cargo contained therein), the semi-truck may detach from the trailer 200 and the trailer may remain stored at the delivery destination with the temperature-sensitive cargo contained therein until the cargo may be unloaded. In some instances, this storage period may last several days in which the HVAC 202 of the trailer may not be operational (e.g., lacking fuel to operate). In such an example, some or all of the cargo contained within the trailer 200 may perish without an appropriate mechanism for maintaining the temperature of the cargo.

In order to solve these problems and others, embodiments of the present disclosure provide a temperature control docking system (TCDS) 100 that is accessible to semi-trucks and associated trailers travelling along transportation routes, where those semi-trucks and/or associated trailers may be stored and/or repaired while maintaining the desired temperature of the cargo contained within the trailer 200. For example, a TCDS 100 of the present disclosure may, in some embodiments, include one or more control docks 102 configured, in an operational configuration, to receive a trailer 200 attached thereto. To facilitate this connection between the control dock 102 and the trailer 200, the control dock 102 may define an interface configured to mate with a corresponding feature (e.g., the rear of the trailer) defined by the trailer 200 attached thereto. In some embodiments, the interface of the control dock 102 may define one or more sealing elements (e.g., gaskets or the like) configured to seal a peripheral edge of the trailer 200 attached thereto. As would be evident to one of ordinary skill in the art in light of the present disclosure, in order to appropriately maintain the temperature of the cargo contained within the trailer 200 (e.g., via circulating cool or warm air), the interface and associated sealing elements may be, in some embodiments, required to provide a weather-proof seal such that cool and/or warm air supplied by the TCDS 100 is not lost to the ambient environment. Such a seal may also prevent rodents, insects, and/or other pests from entering the TCDS 100 and/or trailer 200 while the trailer 200 remains mated with the seal of the TCDS 100.

In order to maintain the temperature of the cargo contained within the trailer 200, the TCDS 100 may include one or more temperature maintenance units (e.g., air conditioning units, heaters, HVAC systems, or the like) associated with one or more control docks 102. In some embodiments, each control dock 102 may be associated with a single temperature maintenance unit configured to, in an operational configuration in which the control dock 102 receives a trailer 200 attached thereto, supply cold and/or warm air for circulation in the trailer 200. As noted above, in order to minimize the amount of cold and/or warm air loss between the temperature maintenance unit(s) and the trailer 200, the interface and associated sealing elements of the control dock 102 may be configured to provide a seal that is weather-proof, watertight, or the like (e.g., so as to prevent or otherwise reduce air leakage). In some embodiments, prior to receiving a trailer 200 attached thereto, each control dock 102 may include a docking door configured to close or otherwise secure the interior of the TCDS 100 (e.g., containing the temperature maintenance unit and the like) in a closed configuration. Once a trailer 200 is attached to the control dock 102, via the interface and sealing elements, the docking door may be opened to allow fluid communication between the temperature maintenance unit and the interior of the trailer 200 as described hereafter. Additionally, in some embodiments, the TCDS 100 may include a sensor system configured to determine if the trailer 200 is attached to the control dock 102 prior to opening of the docking door so as to prevent unauthorized access to the interior of the TCDS 100 (e.g., by unauthorized users, by undesired pests, and/or the like).

In some embodiments, the TCDS 100 may also include various sensor systems (e.g., in communication with a controller of the TCDS 100) configured to, in an operational configuration, determine a temperature of the cargo within the trailer 200. By way of example, in some embodiments, each control dock 102 may include a sensor configured, in the operational configuration, to contact at least a portion of the interior of the trailer 200 received by the control dock 102. In other embodiments, the sensor system of the TCDS 100 (and/or the controller of the TCDS 100) may be configured to, in an operational configuration, be in electrical communication with a temperature monitoring system of the trailer 200. Said differently, in some implementations, the trailer 200 received by a control dock of the TCDS 100 may utilize a temperature monitoring system (e.g., a collection of thermometers, humidity sensors, microcontrollers, drivers, or the like) to independently determine the temperature of the cargo within the trailer 200 and may transmit this information to the TCDS 100 via communication (e.g., electrical, network, or the like) to a corresponding sensor system of the TCDS 100. In some embodiments, the sensor systems of the TCDS 100 (and/or a controller) may be configured to adjust the temperature within the trailer 200 (e.g., via increasing or decreasing air flow) based upon the determined temperature of the cargo within the trailer 200.

Temperature Control Docking System

With reference to FIG. 3, a control dock 102 of the temperature control docking system (TCDS) 100 is illustrated in a closed configuration and illustrated in FIG. 4 with control docks 102 in both closed configurations and operational configurations. As shown, the control dock 102 may include a docking door 104 and one or more sealing elements 106. As shown in the exterior view of FIG. 3, the control dock 102 of the TCDS 100 may be configured to be operated in a closed configuration prior to and immediately following attachment of a trailer 200 with the control dock 102. In the illustrated closed configuration, the docking door 104 may be configured to shield the interior of the TCDS 100 that supports the temperature maintenance unit (described hereafter with reference to FIGS. 5-7). As described more fully hereinafter with reference to the operational configuration, in an instance in which the docking door 104 is open, a portion of the components housed within the TCDS 100 may be exposed. In order to prevent unauthorized access to these components, damage from the weather, and the like, the docking door 104 may be configured to shield the interior of the TCDS 100 until a trailer 200 is correctly attached thereto.

With continued reference to FIG. 3, the control dock 102 may further include one or more sealing elements 106 supported by the interface (e.g., the contact between the control dock 102 and the trailer 200). As described above, the sealing elements 106 may be configured, in an operational configuration, to ensure a water-tight, weather-proof, or the like connection between the trailer 200 and the TCDS 100. In some embodiments, the sealing elements 106 may be configured to seal a peripheral edge of the trailer 200 attached thereto. Said differently, in an operational configuration in which the control dock 102 receives a trailer 200, the sealing elements 106 may be configured to provide continuous contact with a peripheral surface or edge of the trailer 200 so as to enclose one end of the trailer 200. In some embodiments, the sealing elements 106 may extend completely around the docking door 104 and, in an operational configuration, may similarly extend completely around an end of the trailer 200 (e.g., at least around the trailer door 204).

As described above, by providing a weather-proof seal, the sealing elements 106 may operate to prevent leakage of air transmitted between the TCDS 100 and the interior of the trailer 200. In this way, the sealing elements 106 may help to maximize the cooling or heating of the cargo within the trailer 200. In some embodiments, the interface and associated sealing elements 106 of the control dock 102 may be dimensioned (e.g., sized and shaped) so as to receive at least a portion of an end of the trailer 200 therein (e.g., a male to female connection). In this way, the surface of the sealing elements 106 configured to contact the trailer 200 is increased so as to further limit the amount of air potentially leaked via this connection. In some embodiments, the sealing elements 106 may define one or more gaskets configured to seal a peripheral edge of the trailer 200. In such an embodiment, the gaskets may encircle the docking door 104 and may be dimensioned (e.g., sized and shaped) to seal a trailer 200 of any size secured thereto. In order to properly seal the trailer 200 received by the control dock 102, in some embodiments, the gaskets may extend outward from the docking door 104 (e.g., perpendicular with respect to a corresponding edge of the docking door 104) to define a corresponding height or width, depending upon the location of the gasket. As would be evident to one of ordinary skill in the art in light of the present disclosure, the gaskets may, in some embodiments, define a width or height ranging between approximately four (4) inches and of approximately sixteen (16) inches. However, the present disclosure contemplates that the width and/or height of the sealing elements 106 may define any dimension required to properly seal a trailer 200 secured to the control dock 102.

Furthermore, the sealing elements 106 (e.g., gaskets or the like) may, in some embodiments, include one or more of a mounting base, a cushioning element, and an exterior layer. In some embodiments, the mounting base may define a board (e.g., wood, fiber board, or the like) configured to be attached around the control dock 102 (e.g., attached to the structure housing the control dock 102). The cushioning element may be supported by the mounting base and may define a foam or other similarly compressible/resilient material. As would be evident to one of ordinary skill in the art and as described herein, contact between the trailer 200 and the control dock 102 at the sealing element 106 may compress the sealing element 106 (e.g., the cushioning element) so as to prevent damage to the trailer 200 while also sealing the trailer 200. Said differently, the restoring force created by the deformation of the cushioning element by the trailer 200 may function to seal the sealing element 106 (e.g., the gaskets) to the trailer 200 (e.g., provide continuous contact). The exterior layer may shield or otherwise enclose the cushioning element and may define a material configured to protect the cushion element (e.g., vinyl, rubber, neoprene, or the like).

In some embodiments, the interface supporting the sealing elements 106 of the control dock 102 may be configured to be adjustable. By way of example, in some instances, the size of the trailer 200 may exceed the size of the control dock 102 in a closed configuration as shown in FIG. 3. In such an embodiment, the interface and sealing elements 106 may be configured to expand (e.g., via a deformable material, a gearing system, or the like) so as to accommodate the size of the trailer 200. Similarly, in some instances, the dimensions (e.g., size and shape) of the trailer 200 may be such that the interface and associated sealing elements 106 may not properly encircle or otherwise seal the trailer 200 in the closed configuration. As above, the interface and sealing elements 106 may thus be configured to contract as to properly contact the trailer 200. While described and illustrated with a trailer 200 having a rectangular cross-sectional shape, the embodiments of the present disclosure may be configured to accommodate a trailer 200 of any size or shape without limitation. Furthermore, in some embodiments, each control dock 102 of the TCDS 100 may include a locking mechanism (not shown) configured to secure the trailer 200 to the control dock 102.

In some embodiments, each control dock 102 of the TCDS 100 may include one or more contact sensors (e.g., contact sensor 110 in FIG. 5) configured to determine when a trailer 200 is sufficiently attached thereto so as to operate the TCDS 100 in an operational configuration. In certain embodiments, the contact sensors may be in data communication (e.g., wired communication, wireless communication, and/or the like) with a controller (e.g., comprising one or more processors and one or more memory storage areas collectively configured to execute processing instructions) configured to provide control signals to various components of embodiments discussed herein. By way of example, the sealing elements 106 may include one or more pressure sensors or equivalent detection sensors that may be configured to identify contact between the sealing elements 106 and the trailer 200. Data generated by the pressure sensors may be provided to the controller for determining whether a cargo trailer 200 is engaged with the sealing elements 106, and for executing one or more processes upon detecting contact therebetween (e.g., transmitting a control signal to one or more door control motors to move a docking door to an open configuration). In some embodiments, each side of the docking door 104 (e.g., four (4) sides as shown) may include a sealing element 106 that defines one or more pressure sensors housed therein. As would be evident to one of ordinary skill in the art in light of the present disclosure, as the pressure identified by the contact sensor(s) (e.g., contact sensor 110 in FIG. 5) increases, the likelihood of leakage between the control dock 102 and attached trailer 200 with the ambient environment decreases. As such, once the contact sensor determines that the identified contact (e.g., via an identified pressure reading or the like) exceeds a threshold contact reading, the TCDS 100 may determine that the trailer 200 is sufficiently attached to operate in an operational configuration as described below. In an embodiment in which each sealing element 106 located on a respective side of the docking door 104 includes one or more pressure sensors, each of these sensors may determine a pressure reading such that the sensors may collectively determine that the trailer 200 is sufficiently sealed on each side. Said differently, the pressure sensors may ensure that a complete seal of the trailer 200 is present via determining that the pressure reading on each side exceeds a threshold contact reading.

Similarly, the TCDS 100 may also utilize the one or more contact sensors (e.g., contact sensor 110 in FIG. 5 operating in connection with a controller, not shown) to determine when the trailer 200 is sufficiently detached so as to operate the TCDS 100 in a closed configuration (e.g., such that the controller transmits a control signal to one or more motors associated with the dock door 104 to move the dock door to a closed configuration). By way of example, once the trailer 200 is to be detached from the control dock 102 of the TCDS 100 (e.g., after repairing the HVAC 202 or associated semi-truck) the contact sensor may determine that the identified contact (e.g., via an identified pressure reading or the like) does not exceed a threshold contact reading (or determines no reading at all), the TCDS 100 may determine that the trailer 200 is sufficiently detached to operate in a closed configuration. Said differently, once the contact sensors of the control dock 102 determine the trailer 200 is detached from the control dock 102, the TCDS 100 may close the docking door 104 (e.g., by causing a control motor to move the docking door 104 to the closed configuration) to shield the interior of the TCDS 100. In some embodiments, the TCDS 100 may, via monitoring one or more pressure readings from the contact sensors, identify a reduction in contact (e.g., a downward trend in the identified pressure readings) between the trailer 200 and the control dock 102. The TCDS 100 may, in response to this downward trend (e.g., lowering pressure readings) determine that the trailer 200 is detaching from the control dock 102. In such an embodiment, the docking door 104 may begin closing upon determining this trend and may fully close prior to the contact sensors determining that the trailer 200 is fully detached. As such, the docking door 104 may prevent rodents, insects, and/or other pests from entering the TCDS 100 while the trailer 200 detaches from the control dock 102.

With reference to FIG. 5, the TCDS 100 is illustrated in an operational configuration in which at least one control dock 102 is attached to a corresponding trailer 200. As described above, the control dock 102 may, via the contact sensor 110, be configured to identify that the trailer 200 is sufficiently attached to the control dock 102 to operate the TCDS 100 in an operational configuration. As shown, in the operational configuration, the docking door (e.g. docking door 104 in FIGS. 1-4) may be moved to an open position such that access to the interior of the TCDS 100 is provided. In the operational configuration as shown, the TCDS 100 may include a temperature maintenance unit 108 (e.g., air conditioning unit, HVAC system, heating system, or the like) for maintaining the temperature of the cargo within the trailer 200 (e.g., based on control signals generated at a controller, wherein the control signals are generated based at least in part on detected temperature measurements indicative of a temperature of an interior of a cargo trailer). As described above, in some embodiments, each control dock 102 may include an associated temperature maintenance unit 108 configured to facilitate temperature management within only the attached trailer 200 received at that control dock 102. In other embodiments, each temperature maintenance unit 108 may be configured to operate with multiple control docks so as to independently monitor and adjust air flow, as described hereafter, to the interiors of multiple trailers 200 received by multiple control docks 102 of the TCDS 100. In some other embodiments, a single control dock 102 may be associated with multiple temperature maintenance units 108 at once.

As shown in FIGS. 5-6, in some embodiments, the temperature maintenance unit 108 may further be supported by one or more rolling elements or wheels 112 to allow the temperature maintenance unit 108 to be easily movable between control docks 102 (other movement elements, such as slider configurations, tracks, and/or the like may be utilized in certain configurations). Similarly, the wheels 112 may allow for the temperature maintenance unit 108 to also be removed from the TCDS 100 in an instance in which repair to the temperature maintenance unit 108 is required. While illustrated and described herein with reference to a removable temperature maintenance unit 108, the present disclosure contemplates that, in some embodiments, each temperature maintenance unit 108 may be assigned a fixed position within the TCDS 100. For example, as specifically shown in the example configuration of FIG. 7, the temperature maintenance unit 108 may be secured at a fixed position within the TCDS 100, with reference to a single corresponding control dock 102.

As shown in FIG. 5, in some embodiments, the trailer 200 may also define a trailer door 204 configured to prevent access to the interior of the trailer 200. In such an embodiment, in the operational configuration as shown, the trailer door 204 may be configured to be opened to allow fluid communication between the temperature maintenance unit 108 and the interior of the trailer 200. In such an embodiment, the temperature maintenance unit 108 may be configured to circulate cold and/or warm air directly into the interior of the trailer 200 so as to maintain the temperature of the cargo contained therein. In other embodiments, described more fully hereafter with reference to FIG. 8, the trailer door 204 may, in the operational configuration, not be configured to be opened. In such an embodiment, the trailer door 204 may define one or more vents (e.g. vents 208 in FIG. 8) configured to provide fluid communication between the temperature maintenance unit 108 and the interior of the trailer 200. In such an embodiment, the temperature maintenance unit 108 may further define one or more attachment elements (not shown) configured to connect to the one or more vents of the trailer door 204. By way of example, the temperature maintenance unit 108 may include one or more ducts (e.g., conduits, tubes, etc.) configured to direct the cold and/or warm air generated/produced by the temperature maintenance unit 108 into the trailer 200. As would be evident to one of ordinary skill in the art in light of the present disclosure, in some embodiments, the temperature maintenance unit 108 may be housed within the TCDS 100 in a sealed room or other enclosure so as to provide increased thermal efficiency.

As described above, in some embodiments, the TCDS 100 may include one or more sensor systems (not shown) configured to, in an operational configuration, determine a temperature of the cargo within the trailer 200. In some embodiments, each control dock 102 may include a temperature sensor, a humidity sensor, or the like configured to contact at least a portion of the interior of the trailer 200 received by the control dock 102. By way of example, in an instance in which the trailer door 204 is opened in the operational configuration, the sensor system (not shown) may directly contact the interior of the trailer 200 and/or the cargo housed therein. In embodiments in which the temperature maintenance unit 108 utilizes a conduit, duct, or the like to provide fluid communication between the temperature maintenance unit 108 and the trailer 200, the conduit, duct, or the like may include a sensor that extends into or otherwise contacts the interior of the trailer 200.

Furthermore, in some embodiments, the sensor system of the TCDS 100 may be configured to be in electrical communication with a temperature monitoring system of the trailer 200. Said differently, in some implementations, the trailer 100 received by a control dock of the TCDS 100 may utilize a temperature monitoring system (e.g., a collection of thermometers, humidity sensors, microcontrollers, drivers, or the like) to independently determine the temperature of the cargo within the trailer 200 and may transmit this information to the TCDS 100 via communication (e.g., electrical, network, or the like) to a corresponding sensor system of the TCDS 100. In any of these embodiments, the sensor systems of the TCDS 100 may be configured to adjust the temperature within the trailer 200 (e.g., via increasing or decreasing air flow) based upon the determined temperature of the cargo within the trailer 200.

With reference FIG. 6, an example temperature maintenance unit 108 is illustrated supported by wheels 112. As shown, in some embodiments, the temperature maintenance unit 108 may define a first side 116 and a second side 114. In such an embodiment, the first side 116 may be configured to direct cold or warm air, in the operational configuration, into the trailer 200 received by the corresponding control dock 102. As described with reference to FIG. 7 below, the first side 116 may contact or otherwise be disposed proximate to one or more vents 208 of the trailer door 204 so as to provide cold and/or warm air into the interior of the trailer 200. Furthermore, the second side 114, may be configured to vent warm or cold air (e.g., depending of the air temperature directed by the first side 116) into the interior of the TCDS 100. In some embodiments in which the HVAC 202 of the trailer 200 is at least partially operational, the temperature maintenance unit 108 may be configured to assist the HVAC 202 in adjusting the temperature within the trailer 200. Said differently, in some embodiments, the HVAC 202 of the trailer 200 may be configured to at least partially direct operation of the temperature maintenance unit 108 to as to optimize power usage in cooling or warming the cargo of the trailer 200. In other embodiments, the temperature maintenance unit 108 may be configured to receive an indication of or otherwise determine the remaining fuel of the HVAC 202. In such an embodiment, the temperature maintenance unit 108 may be configured to operate in a standby mode until receiving instructions that the HVAC 202 of the trailer 200 has depleted its fuel supply and requires assistance in maintaining the temperature of the cargo within the trailer 200.

With reference to FIG. 7, a cross-sectional view of an example control dock 102 and temperature maintenance unit 108 in an operational configuration are illustrated. As shown, the docking door 104 is opened and stored, in some embodiments, in a rolled-up configuration such that the first side 116 of the temperature maintenance unit 108 may be located proximate one or more vents 208 defined in the trailer door 204 of the trailer 200. During operation, the temperature maintenance unit 108 may determine, for example, that the cargo 206 within the interior of the trailer 200 is too warm via one or more temperature sensors or the like (not shown). Upon determining that the air within the trailer 200, and by association the cargo 206, is too warm, the temperature maintenance unit 108 may be configured to supply cold air via the first side 116 to the interior of the trailer 200 by the one or more vents 208. During operation, the second side 114 of the temperature maintenance unit 108 may vent warm air into the interior of the TCDS 100. In this way, the embodiments of the present disclosure provide for systems and devices that may maintain the cargo 206 within the trailer 200 at a desired temperature in an instance in which the HVAC 202 of the trailer fails in order to ensure the cargo 206 does not spoil or otherwise become unusable during the repair of the HVAC 202.

While described and illustrated herein with reference to a TCDS 100 that is located at a fixed location, the present disclosure also contemplates that the TCDS 100 may, in some embodiments, operate as a mobile temperature management system. By way of example, in instances in which one or more semi-trucks or other transportation vehicles malfunction while away from a fixed TCDS 100 location, a mobile TCDS 100 may be used. With reference to FIG. 9, an example mobile TCDS 300 is illustrated. As shown, the mobile TCDS 300 may resemble the structure of the TCDS 100 as described above and may include one or more control docks 102. The mobile TCDS 300 may, in some embodiments, be supported by a trailer or other mobile structure such that the mobile TCDS 300 may be moved to the location of the malfunctioning transportation vehicles to assist in maintaining the temperature of the cargo contained therein. As above, each control dock 102 may include an associated temperature maintenance unit (e.g., air conditioning unit, HVAC system, heating system, or the like) for maintaining the temperature of the cargo within a trailer attached thereto (not shown). In an operational configuration, one or more trailers (e.g., trailers 200 in FIGS. 2-5) may be backed up to mate with a corresponding control dock 102.

As above in the TCDS 100, one or more contact sensors (e.g., contact sensor 110 in FIG. 5) may be configured to determine that a trailer is sufficiently sealed by the sealing elements 106 and the corresponding docking door 104 may open such that the control dock 102 of the mobile TCDS 300 may operate in an operational configuration as described above. In the operational configuration, the temperature maintenance unit(s) may supply cold and/or warm air to the trailer 200 so as to maintain the temperature of the cargo contained therein. In some embodiments, an opposite side of the mobile TCSD 300 (not shown) may also define one or more control docks 102 such that one or more trailers may also be backed up to mate with the opposite side of the mobile TCDS 300. While illustrated and described herein with reference to a mobile TCDS 300 having four (4) control docks 102, the present disclosure contemplates that the mobile TCDS 300 may define any number of control docks 102 disposed at any location of the mobile TCDS 300.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A temperature control docking system (TCDS) comprising:
    a plurality of control docks, wherein each control dock of the plurality of control docks is configured for receiving a freight trailer;
    a docking door at each of the plurality of control docks to separate an interior of the TCDS from the freight trailer, and wherein the docking door is configured between a closed configuration and an open configuration; and
    a plurality of temperature maintenance units positioned within the interior of the TCDS, wherein each of the plurality of temperature maintenance units corresponds with a respective control dock of the plurality of control docks, wherein each of the plurality of temperature maintenance units is configured to supply climate controlled air through the docking door of the respective control dock of the plurality of control docks (i) while the docking door is in the open configuration for circulation within an interior of the freight trailer received at the respective control dock of the plurality of control docks and (ii) based at least in part on receiving, from a heating, ventilation, and air conditioning (HVAC) system of the freight trailer, an indication that the HVAC system requires assistance in maintaining a temperature within the interior of the freight trailer,
    wherein each of the plurality of temperature maintenance units comprises one or more ducts extending through the docking door for connection with one or more vents of the freight trailer received at the respective control dock and for directing the climate controlled air into the interior of the freight trailer received at the respective control dock.

2. The TCDS of claim 1, wherein each of the plurality of control docks comprises one or more sealing elements configured to interface with one or more corresponding elements of a freight trailer received at each of the plurality of control docks to define a seal between the TCDS and the freight trailer received at each of the plurality of control docks.

3. The TCDS of claim 2, wherein the one or more sealing elements are configured to provide a weather-proof seal between the TCDS and the freight trailer received at each of the plurality of control docks.

4. The TCDS of claim 2, wherein the one or more sealing elements are adjustable to interface with a plurality of freight trailers.

5. The TCDS of claim 1, further comprising:
a sensor system configured to detect engagement between the freight trailer received at the respective control dock and the respective control dock of the plurality of control docks, and
a controller configured to, upon detecting engagement between the freight trailer and the respective control dock of the plurality of control docks, move the docking door to the open configuration.

6. The TCDS of claim 5, wherein the sensor system is further configured to detect disengagement between the freight trailer and the respective control dock of the plurality of control docks, and
the controller is configured to, upon detecting disengagement between the freight trailer and the respective control dock of the plurality of control docks, move the docking door at the respective control dock to the closed configuration.

7. The TCDS of claim 5, wherein the sensor system comprises a plurality of pressure sensors within the respective control dock of the plurality of control docks, and wherein the plurality of pressure sensors are configured to detect the freight trailer applying pressure on the plurality of pressure sensors to detect engagement between the freight trailer and the respective control dock of the plurality of control docks.

8. The TCDS of claim 1, further comprising:
a temperature sensor system configured to monitor a temperature within the interior of the freight trailer received at the respective control dock; and
a controller configured to adjust operation of the plurality of temperature maintenance units based at least in part on a detected temperature within the interior of the freight trailer received at the respective control dock.

9. The TCDS of claim 1, wherein the plurality of temperature maintenance units are each configured for providing at least one of: heated output air or cooled output air, and wherein each of the plurality of temperature maintenance units comprises support wheels to facilitate movement of each of the plurality of temperature maintenance units within the interior of the TCDS.

10. The TCDS of claim 1, further comprising a controller configured for communication with the HVAC system of the freight trailer, and wherein the controller is configured to:
receive, the indication that the HVAC system requires assistance in maintaining the temperature within the interior of the freight trailer; and
adjust operation of one or more temperature maintenance units of the plurality of temperature maintenance units based at least in part on receiving the indication from the HVAC system.

11. The TCDS of claim 1, wherein the TCDS is embodied as a mobile trailer, and wherein the plurality of temperature maintenance units are located within an interior of the mobile trailer.

12. A method for temperature maintenance, the method comprising:
engaging each of a plurality of freight trailers with a corresponding control dock of a plurality of control docks;
configuring a docking door at each of the plurality of control docks to an open configuration, wherein each of the plurality of docking doors separate an interior of a temperature control docking system (TCDS) from the plurality of freight trailers;
receiving, from a heating, ventilation, and air conditioning (HVAC) system of a freight trailer of the plurality of freight trailers, an indication that the HVAC system requires assistance in maintaining a temperature within the interior of the freight trailer;
supplying, based at least in part on receiving the indication from the HVAC system, temperature controlled air from a temperature maintenance unit for circulation within the interior of the freight trailer, the temperature maintenance unit positioned within the interior of the TCDS, wherein the temperature maintenance unit corresponds to a respective control dock of the plurality of control docks, and
fluidly connecting the temperature maintenance unit with an interior of the freight trailer by means of one or more ducts connected to the temperature maintenance unit and one or more vents of the freight trailer and directing climate controlled air into the interior of the freight trailer.

13. The method of claim 12, wherein engaging each of the plurality of freight trailers with respective control docks of the plurality of control docks comprises engaging one or more sealing elements to provide a weather-proof seal between a control dock of the plurality of control docks and a respective freight trailer of the plurality of freight trailers.

14. The method of claim 12, further comprising adjusting each of the plurality of control docks to engage one or more features of the plurality of freight trailers.

15. The method of claim 12, wherein engaging each of the plurality of freight trailers with respective control docks of the plurality of control docks comprises applying pressure to one or more pressure sensors within each of the plurality of control docks.

16. The method of claim 12, further comprising:
monitoring respective temperatures within respective interiors of each of the plurality of freight trailers, wherein monitoring the respective temperatures comprises receiving temperature data generated by one or more temperature sensors onboard each of the plurality of freight trailers.

17. The method of claim 12, further comprising positioning each of the plurality of temperature maintenance units adjacent respective docking doors of the plurality of docking doors so as to enable providing the temperature controlled air for circulation within the interior of each of the plurality of freight trailers.

* * * * *